United States Patent
Baehr et al.

(10) Patent No.: US 7,350,634 B2
(45) Date of Patent: Apr. 1, 2008

(54) METHOD FOR ADJUSTING AN INCREMENTAL PATH MEASUREMENT UNIT IN AN ACTUATION DEVICE OF A PRESSURE-CLOSED CLUTCH AS WELL AS AN ACTUATION DEVICE

(75) Inventors: Markus Baehr, Achern (DE);
Christian Rieger, Bischweier (DE);
Juergen Gerhart, Appenweier (DE);
Gerd Jaeggle, Sasbach (DE); Reinhard Berger, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 279 days.

(21) Appl. No.: 11/168,854

(22) Filed: Jun. 28, 2005

(65) Prior Publication Data

US 2006/0016662 A1    Jan. 26, 2006

(30) Foreign Application Priority Data

Jun. 30, 2004    (DE) ...................... 10 2004 031 481

(51) Int. Cl.
*F16D 48/06*    (2006.01)
*F16D 25/12*    (2006.01)

(52) U.S. Cl. .............. 192/85 R; 192/30 W; 192/110 R
(58) Field of Classification Search .................... None
See application file for complete search history.

(56) References Cited

U.S. PATENT DOCUMENTS 5,678,673 A    10/1997 Borschert et al. .......... 192/84.6
5,934,432 A *    8/1999 Bates ....................... 192/85 C
2004/0102287 A1 *    5/2004 Eggert et al. .................. 477/84

FOREIGN PATENT DOCUMENTS

| DE | 44 33 825 | 4/1996 |
|----|-----------|--------|
| DE | 197 00 935 | 8/1997 |
| DE | 197 23 393 | 12/1997 |
| DE | 103 08 719 | 10/2003 |
| EP | 1 450 062 | 8/2004 |
| GB | 2 211 577 | 7/1989 |
| GB | 2 313 885 | 12/1997 |
| GB | 2329227 A * | 3/1999 |
| WO | WO 02/101258 | 12/2002 |

* cited by examiner

Primary Examiner—Richard M Lorence
(74) Attorney, Agent, or Firm—Simpson & Simpson, PLLC

(57) ABSTRACT

Actuation devices are disclosed for a pressure-closed clutch where the position of an actuation member is acquired by an incremental sensor. In an embodiment of the actuation device, the signal of the incremental sensor is acquired in case of a sudden change in the power consumption of an actuator and is used as a new reference signal. In another embodiment, the actuation member, while the spindle is rotating, is moved by a recovery spring during the closing of the clutch against a stop and the signal of the incremental sensor upon the attainment of said stop is used as a reference signal.

4 Claims, 3 Drawing Sheets

METHOD FOR ADJUSTING AN INCREMENTAL PATH MEASUREMENT UNIT IN AN ACTUATION DEVICE OF A PRESSURE-CLOSED CLUTCH AS WELL AS AN ACTUATION DEVICE

CROSS REFERENCE TO RELATED APPLICATIONS

This patent application claims priority of German Patent Application No. 10 2004 031 481.0 filed Jun. 30, 2004, which application is incorporated herein by reference.

FIELD OF THE INVENTION

This invention relates to a method for adjusting an incremental path measurement unit in an actuation device of a pressure-closed clutch as well as an actuation device for a pressure-closed clutch.

BACKGROUND OF THE INVENTION

Automated clutches are increasingly used in motor vehicles, just as automated gears, not only for improvement in comfort, but also due to the resultant possible reduction of consumption. Conventional clutches contain a plate spring that keeps the clutch in the engaged state. The clutch must be disengaged with an actuation device against the force of the plate spring. It is especially due to the use of precisely controllable electric motors that it has recently become possible to eliminate the powerful plate spring that closes the clutch by pressure and to close the clutch by pressure with the help of the external actuation device. In that way, the clutch can be made in a lightweight fashion. Weak opening springs can be contained in it so that the clutch will reliably open completely.

Electric motor actuation devices for automated clutches frequently contain a spindle drive in which the rotation of a spindle, driven by the electric motor, is converted into a movement of an actuation member for the clutch. The rotation of the spindle is acquired by an incremental sensor, which, depending on a predetermined angle of rotation, produces a pulse that is counted in a control unit. The position of the actuation member must be known absolutely for the sake of the precise control of the clutch; therefore, the actuation device must be adjusted as required, that is to say, the counting status of the incremental sensor must be associated with a predetermined position of the actuation member. This is done in an actuation device according to DE 443 38 25 C2 in the following manner: As a result of the drive provided by the electric motor, stops are approached where one corresponds to the fully opened position of the clutch, while the other one corresponds to the fully closed position. The fact that the stop has been reached is sensed on each occasion so that the currently existing counting status of the pulses of the incremental sensor can be taken as a standard or reference status.

BRIEF SUMMARY OF THE INVENTION

The object of the invention is to provide a simply executed method for the adjustment of an incremental path measurement unit in an actuation device of a pressure-closed clutch. The invention furthermore is intended to provide an actuation, device for a pressure-closed clutch by means of which one can implement such a method.

A first solution of the task underlying the invention is achieved with a method for the adjustment of an incremental path measurement unit in an actuation device of a pressure-closed clutch, where the actuation device contains an actuator whose position is acquired by an incremental sensor and that is connected with a transmitter piston, which, via a hydraulic segment with a snifting borehole on the side of the transmitter piston, is connected with a receiver piston that actuates the clutch, which method includes the following steps:

acquisition of the force that the actuator needs to move the transmitter piston;

acquisition of the output signal of the incremental sensor at the precise moment at which the force chances abruptly as the transmitter piston runs over the snifting borehole; and, fixing the output signal of the incremental sensor at the precise moment of the abrupt change as a new reference signal.

Preferably, the actuation device contains an electric motor that is connected with the transmitter piston via a self-inhibiting spindle drive and the movement of the transmitter piston in the direction of the closing of the clutch is supported by a compensation spring in the course of which method the abrupt change in the force will be acquired only in case of a change of the transmitter piston in the direction of the opening of the clutch.

An actuation device for a pressure-closed clutch by means of which the above-mentioned method can be implemented includes:

an electric motor for the purpose of moving a transmitter piston that via a hydraulic segment with snifting borehole on the transmitter piston side is connected with a receiver piston that actuates the clutch;

a self-inhibiting spindle drive for the conversion of a rotation of the spindle driven by the electric motor into a linear motion of the transmitter piston;

an incremental sensor for the acquisition of the rotation of the spindle;

a compensation spring that supports a movement of the transmitter piston in the direction of the closing of the clutch; and, a control device that acquires the power consumption of the electric motor during the movement of the transmitter piston with which the incremental sensor is connected and that has a storage unit, which stores the signal of the incremental sensors in case of an abrupt change in the power consumption as a reference signal.

Advantageously, the pressure-closed clutch is pre-stressed in the opening direction and the opening stroke of the clutch is limited by a stop.

Let us look at another method for the adjustment of an incremental path measurement unit in an actuation device in a pressure-closed clutch by means of which the problem involved in the invention can be solved: Here, the actuation device contains an actuator that can be impacted with power output and whose position is acquired by an incremental sensor and that is connected with an actuation member for the clutch, where the actuation member is so pre-stressed in the clutch opening direction by one of the pre-stressing units that, when the actuator is without power, is pushed so that it will come to rest against a fixed stop, which method includes the following steps:

switching the actuator so that it will have no power;

acquiring the fact that the actuation member has come to a stop; and, fixing the output signal of the incremental sensor at the moment the actuation member comes to a stop as a new reference signal.

Preferably, the actuator is an electric motor that drives a spindle that is in non-inhibiting thread engagement with the actuation member and the incremental sensor acquires the rotation of the spindle.

The actuation device for a pressure-closed clutch by means of which the two above-mentioned methods can be implemented includes:

an electric motor for the rotary drive of a spindle, an actuation member for the actuation of the clutch that is in non-inhibiting thread engagement with the spindle and an incremental sensor for the acquisition of the rotation of the spindle;

a pre-stressing device that pre-stresses the actuation member in the clutch opening direction in such a manner that, when the motor has no current, it will move while the spindle is rotating against a fixed stop; and, a control device that controls the electric motor with which the incremental sensor is connected and that has a storage unit that stores the signal of the incremental sensor when the electric motor has no power and stores a standstill of the incremental sensor that acquires the spindle as a reference signal.

BRIEF DESCRIPTION OF THE DRAWINGS

The invention will be described below with reference to the diagrams and by way of examples along with further details.

The figures show the following.

DETAILED DESCRIPTION OF THE INVENTION

Figure 1:
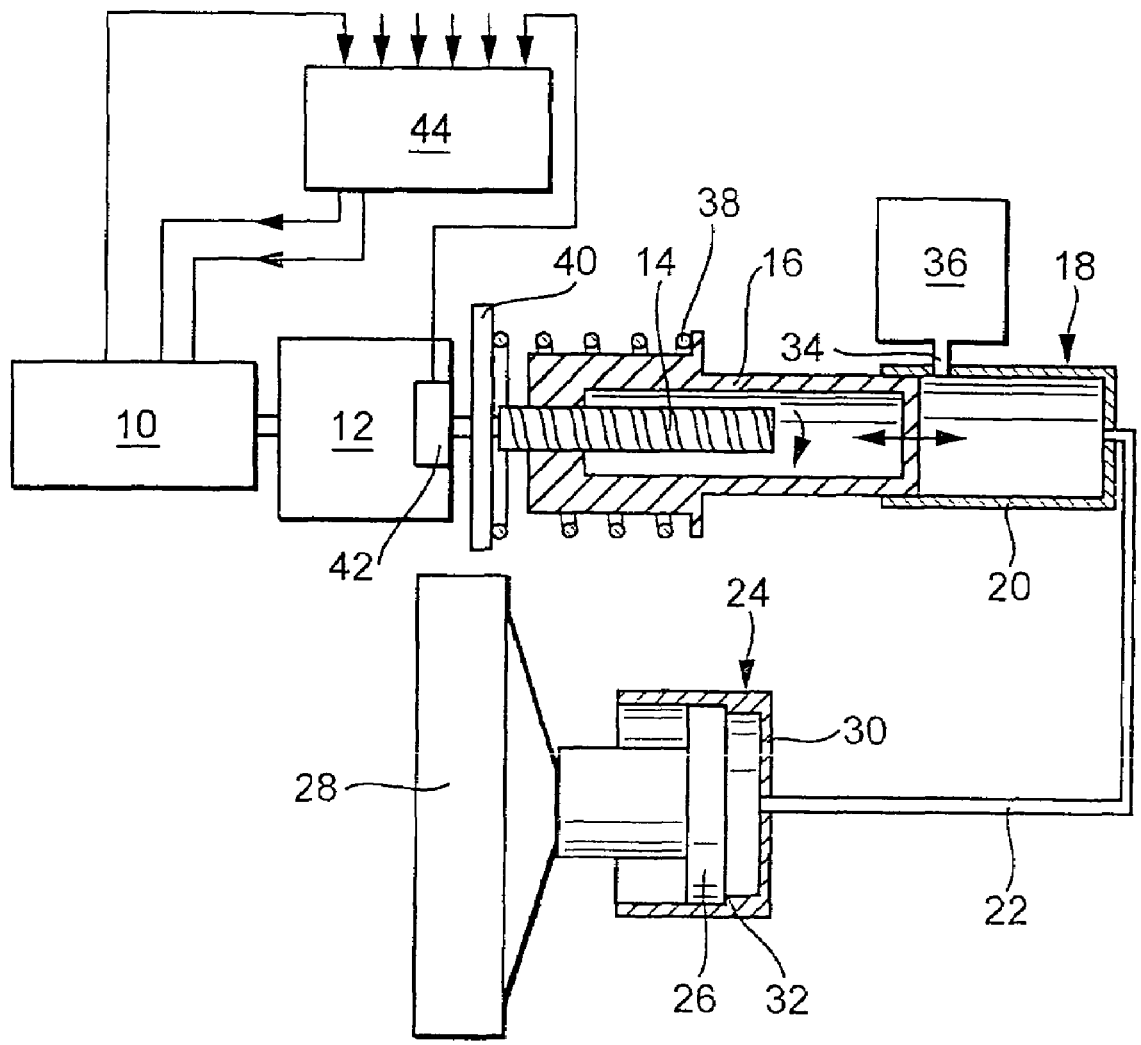
FIG. 1 shows a first embodiment of an actuation device for a pressure-closed clutch in a basic illustration.

According to FIG. 1, an electric motor 10 is connected with a gear 12 whose output shaft ends in a spindle 14, which is in threaded engagement with a transmitter piston 16 of a transmitter piston/cylinder unit 18. The transmitter cylinder 20 is connected via a hydraulic line 22 with a receiver piston/cylinder unit 24 whose receiver piston 26 actuates a clutch 28, whose structure is known as such, where the clutch is pressure closed by the receiver piston 26, that is to say, it is pressed into engagement. Weak recovery springs (not shown) are possibly arranged in the clutch and these recovery springs force the clutch 28 into disengagement where the opening stroke of the clutch is limited by a stop 32 that is made on cylinder 30 of the transmitter piston/cylinder unit 18.

Transmitter cylinder 20 is made with a snifting borehole 34 that leads to a hydraulic medium tank 36. The movement of transmitter piston 16 according to FIG. 1 to the right is supported by a compensation spring 38 that is supported between a fixed stop 40 and the transmitter piston 16.

The rotation of spindle 14 is acquired by an incremental sensor 42 that is connected with an input of electronic control unit 44. The operation of electric motor 10 is controlled via outputs of the control unit 44. Another input of control unit 44 acquires the power consumption of electric motor 10.

Control unit 44 contains a microcomputer and a storage unit in which, for example, the momentary characteristic of the clutch 24 is stored, which indicates the transmissible clutch moment as a function of the position of the receiver piston 26. Other inputs of control unit 44 are connected with the sensors or other control units according to which the operation of the clutch is controlled.

The structure and the operating mode of the described components are known as such and will therefore not be explained here in any further detail.

Looking at FIG. 2, the operation of the arrangement according to FIG. 1 is explained below in greater detail with a view to an adjustment of the incremental sensor 42.

Figure 2:
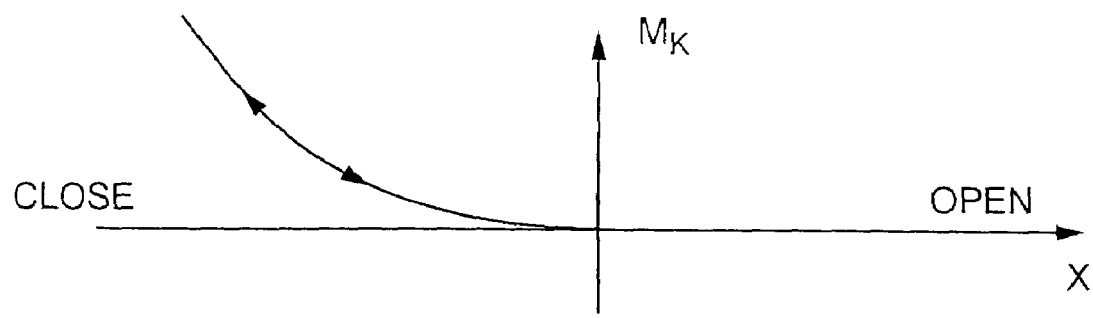
FIG. 2 shows force-path curves to explain the way the actuation device shown in FIG. 1 works.
Figure 2:
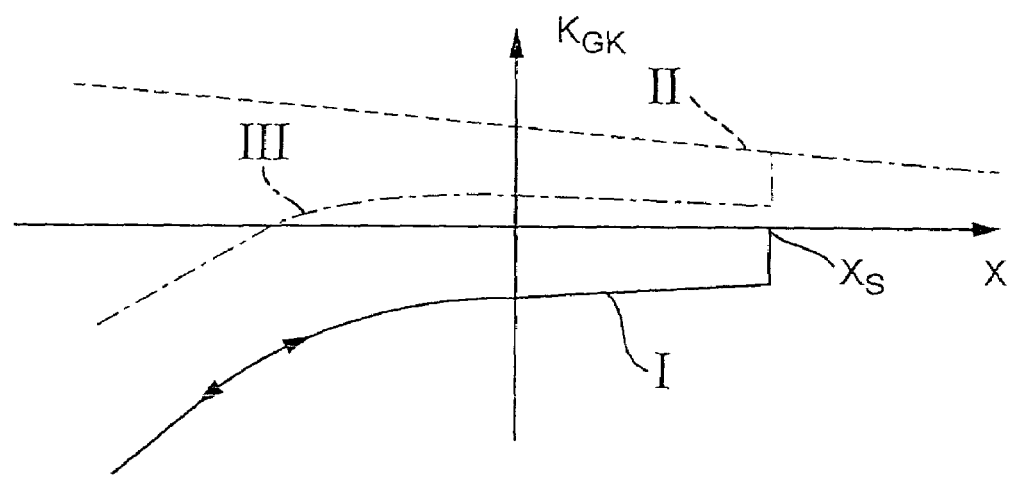
Figure 2:
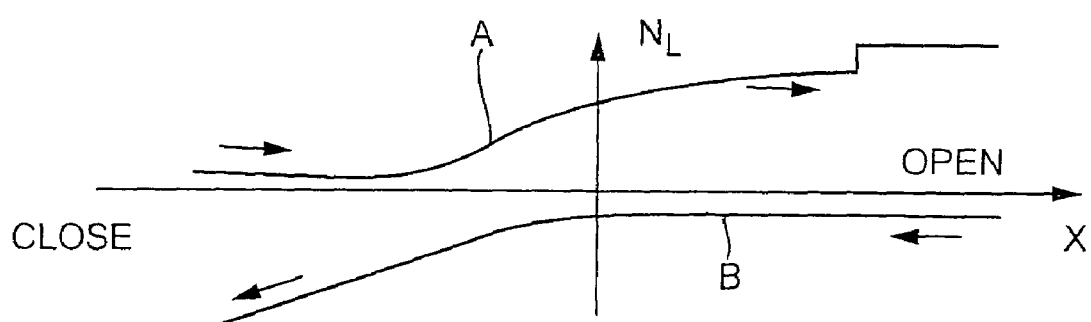

The three graphic illustrations of FIG. 2 on the abscissa side in each case indicate the position x of transmitter piston 16 where a movement to the right will correspond to an opening of clutch 28 and a movement to the left will correspond to the closing or engagement of clutch 28. The topmost diagram shows the coupling moment MK on the ordinate. The diagram in the middle on the ordinate shows the force KGK that acts on the transmitter piston and the bottom diagram on the ordinate shows the load moment NL of electric motor 10.

Referring now to the top diagram, clutch 28, when transmitter piston 16 after running over the snifting borehole 34 according to FIG. 1 is moved to the right, is then increasingly closed by the receiver piston 26, which then correspondingly moves to the left, as a result of which a rising clutch moment MK can be transmitted. The curve, given in the top diagram, is run through in both directions without any essential hysteresis.

When the transmitter piston 16 according to FIG. 1 is moved to the right (in the middle diagram in FIG. 2, that corresponds to a movement to the left), then this movement essentially takes place without any force so long as transmitter piston 16 is to the left of the snifting borehole 34 and, the moment the transmitter piston 16 runs over the snifting borehole 34 (position xS) against the force of clutch 28, receiver piston 26 first of all is moved against the opening springs of the clutch and then places the friction linings of the clutch into friction engagement. The solid line in the middle diagram thus represents the force that works from the hydraulic segment upon the transmitter piston 18, which force essentially is independent of the direction of movement of transmitter piston 16. Superimposed upon this force that acts from the hydraulic segment is the force of compensation spring 38 that supports the movement of transmitter piston 16 in the clutch closing direction so that one gets the dot-dash line III as the resultant total force acting upon transmitter piston 16. To move transmitter piston 16 against resultant force III, electric motor 10 must provide a load moment NL that depends on the translation of the spindle drive. When the spindle is without friction and is designed without self-inhibition, the load moment that must be supplied by electric motor 10 independently of the direction of movement will have the outline of curve III. The spindle drive, however, is advantageously designed in a self-inhibiting manner so that clutch 28 will remain in its closed state even when the electric motor 10 is switched in a currentless manner.

When spindle 14 is so rotated that piston 16 is moved into the opening direction, piston 16 works in the area in which it runs over the snifting opening 34 according to FIG. 1 to the left against the force of the compensation spring 38 so that the force jump at xS will be noticed in case of a jump of the load moment NL. The development of the load moment of the motor during the opening of the clutch is given in the bottom diagram by the curve A.

As the clutch is closed (curve B), the movement of transmitter piston 16 is supported by the force of compensation spring 38 so that the moment to be supplied by the spindle or electric motor 10 in the area where the snifting opening 34 is run over will be very small and so that the force jump of curve III is essentially smoothed out.

When the spindle gear is designed in a self-inhibiting manner, the force jump of curve III in terms of a jump of load moment NL of electric motor 10 is noticed only when the clutch is opened. This moment jump can be acquired by control unit 44 by means of a sudden change in the power consumption of electric motor 10. The counting level, present at the time of the load jump of the pulses of the incremental sensor 42 analyzed in control unit 44, can be set at zero at the moment of the load jump so that this counter status, which corresponds to the position of piston 18 as the snifting borehole 34 is run over, can be used as a reference value for the further control of electric motor 10 or for the purpose of clutch actuation.

Figure 3:
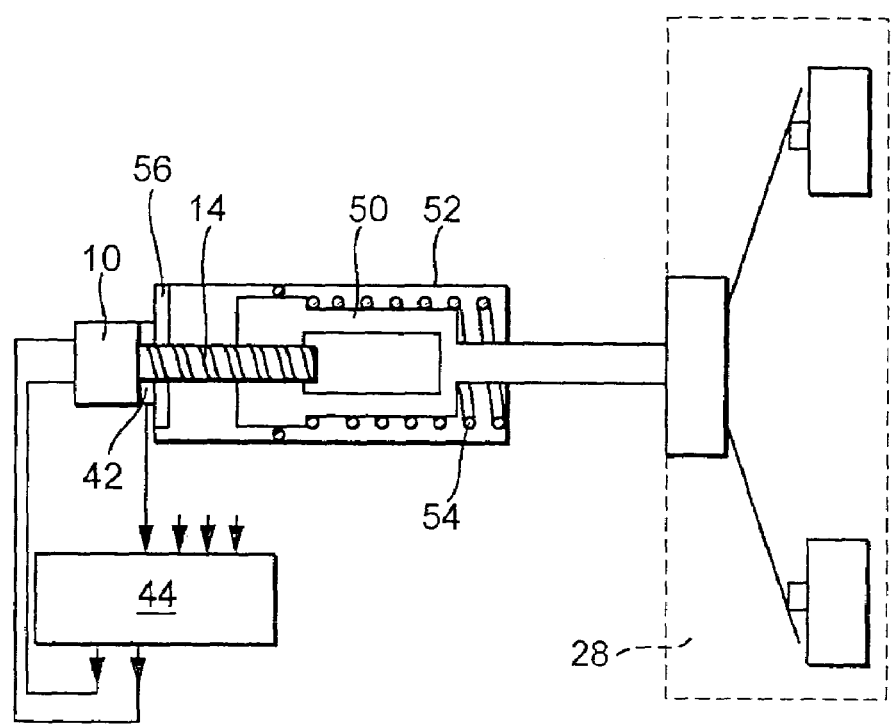
FIG. 3 shows a basic diagram of another embodiment of an actuation device.

Referring to FIG. 3, another embodiment of an actuation device for a pressure-closed clutch is explained below; here, corresponding parts according to the embodiment in FIG. 1 are labeled with the same reference numbers.

According to FIG. 3, an electric motor 10 drives a spindle 14 that is in thread engagement with an actuation member 50, which is received in a fixed housing 52 in a nonrotary but axially movable manner. Actuation member 50 here directly actuates the pressure-closed clutch 28.

As one can furthermore see in FIG. 3, a recovery spring 54 works between a basic body of the actuation member 50 and the housing 52 and that recovery spring prestresses the actuation member 50 in the direction of the opening of a clutch 28. The thread engagement between spindle 14 and actuation member 50 is not self-inhibitory in contrast to the preferred embodiment in FIG. 1. Furthermore, electric motor 10 is so designed that, when it is in the currentless state, it will be overpressed by the recovery spring 54 so that actuation member 50 is moved by the force of spring 54 with rotation of spindle 14 to the left according to FIG. 3 until actuation member 50 rests against a stop 56 on the inside of housing 52. The rotation of the spindle is acquired by incremental sensor 42.

The way the arrangement according to FIG. 3 works will be explained below in greater detail with reference to the force-path curves according to FIG. 4.

Figure 4:
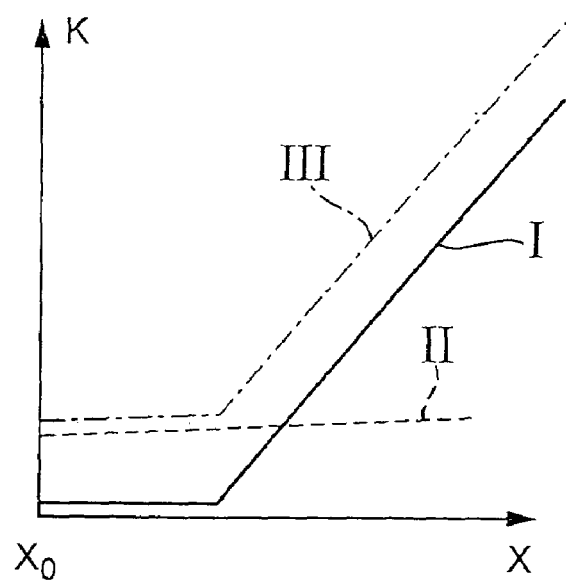
FIG. 4 shows force-path curves to explain the function of the actuation unit according to FIG. 3.

In FIG. 4, the abscissa represents the position x of actuation member 50. The ordinate in each case indicates a force K. Curve I indicates the engagement force of clutch 28 where the illustration is schematic and curve I actually runs in the form of a curved line. Position xo is the position that is assumed by the actuation member 50 when it rests against stop 56.

The broken straight line II indicates the force by means of which actuation member 50 presses upon the recovery spring 54. The dot-dash curve III indicates the resultant total force by means of which actuation member 50 is moved as clutch 28 is either closed or opened.

When, during the opening of the clutch, electric motor 10 is switched currentless, then the recovery spring 54, as a result of its prestress, is in a position to move the actuation member 50 with rotation of spindle 14 to the left up to stop 56. The rotation of spindle 14 is acquired by the incremental sensor 42 and can be analyzed in control unit 44. The rotation of spindle 14 ends the moment actuation member 50 comes to rest against stop 56. Incremental sensor 42 thus no longer produces a pulse, something that is recognized in the control unit. The counting status of the pulses at the moment spindle 14 comes to a standstill can be used as a reference counting status so that every time stop 56 is reached, the incremental sensor can be adjusted and the absolute position of actuation member 50 or of clutch 28 will be known.

The above-mentioned adjustment strategy is basically also possible when clutch 28 itself provides a sufficiently high recovery force in order to move actuation member 50 against stop 56. But there is a disadvantage to that. The clutch itself must be made in a more demanding fashion and the entire actuation segment is impacted with a high resetting force. Besides, the resetting device, integrated into the clutch, would have to be made very strong so that, considering the action, straight lines and frictions that change with the temperature, oscillations, service life, etc., one could in every situation make sure that the spindle will be pressed against the stop when the electric motor is currentless.

By shifting the recovery spring 54, which can be formed by any kind of force storage unit into the actuator consisting of electric motor 10, spindle 14, housing 52 and actuation member 50, only the electric motor and the translation mechanics will be loaded with the recovery spring force.

The embodiment of the actuation device, shown in the diagram in FIG. 3, can be employed advantageously especially in double-clutch systems where one must make sure that the clutches will open in case of a failure of the onboard supply unit or control unit, in other words, when they are in the currentless state.

The exemplary embodiments, described by way of example, can be modified in many different ways. Other toothed gear drives can be used as desired in place of a spindle drive. The actuator need not necessarily contain an electric motor; instead, for example, it can be formed by a hydraulic or other kind of setting cylinder.

LIST OF REFERENCES

10 Electric motor
12 Gear
14 Spindle
16 Transmitter piston
18 Transmitter piston/cylinder unit
20 Transmitter cylinder
22 Hydraulic line
24 Receiver piston/cylinder unit
26 Receiver piston
28 Clutch
30 Cylinder
32 Stop
34 Snifting borehole
36 Hydraulic medium tank
38 Compensation spring
40 Stop
42 Incremental sensor
44 Control unit
50 Actuation member
52 Housing
54 Recovery spring
56 Stop

What is claimed is:
1. A method for adjustment of an incremental path measurement unit in an actuation device of a pressure-closed clutch, where the actuation device contains an actuator (10, 12, 14) whose position is acquired by an incremental sensor

(42) and that is connected with a transmitter piston (16) which is displaceably contained in a cylinder unit (18) and having a snifting borehole (34), the cylinder unit (18) is connected via a hydraulic segment (22) to a receiving cylinder (30) with a displaceable receiver piston (26) which actuates the clutch (28), which method involves the following steps:

acquiring a force that the actuator (10, 12, 14) needs to move the transmitter piston (16);

acquiring an output signal of the incremental sensor (42) at a point in time at which the force changes abruptly as the transmitter piston (16) runs over the snifting borehole (34); and, fixing the output signal of the incremental sensor (42) at the point in time of the abrupt change as a new reference signal.

2. The method according to claim 1, where the actuation device contains an electric motor (10) that is connected with the transmitter piston via a self-inhibiting spindle drive (14) and a movement of the transmitter piston (16) in the clutch closing direction (28) is supported by a compensation spring (38) in which method the abrupt change in the force is acquired only when the transmitter piston moves in the opening direction of clutch (24).

3. An actuation device for a pressure-closed clutch comprising:

an electric motor (10) for the purpose of moving a transmitter piston (16) which is displaceably contained in a cylinder unit (18) with a snifting borehole (34) that, via a hydraulic segment (22), is connected with a cylinder containing a displaceable receiver piston (26), and the receiver piston (26) actuates the clutch (28);

a self-inhibiting spindle drive (14) for the purpose of converting a rotation of the spindle (14) driven by the electric motor into a linear movement of the transmitter piston (16);

an incremental sensor (42) to acquire the rotation of the spindle;

a compensation spring (38) that supports a movement of the transmitter piston in the clutch-closing direction; and, a control device (44) that acquires a power consumption of the electric motor (10) during the movement of the transmitter piston (16), which is connected with the incremental sensor (42) and which has a storage unit that stores a signal of the incremental sensor in case of an abrupt change of the power consumption as a reference signal.

4. An actuation device according to claim 3, where the pressure-closed clutch (28) is prestressed in the direction of opening and the opening stroke of the clutch is limited by a stop (32).

\* \* \* \* \*